No. 864,004.  
PATENTED AUG. 20, 1907.  
E. L. KNIGHT.  
CAR WHEEL LUBRICATOR.  
APPLICATION FILED MAY 6, 1907.
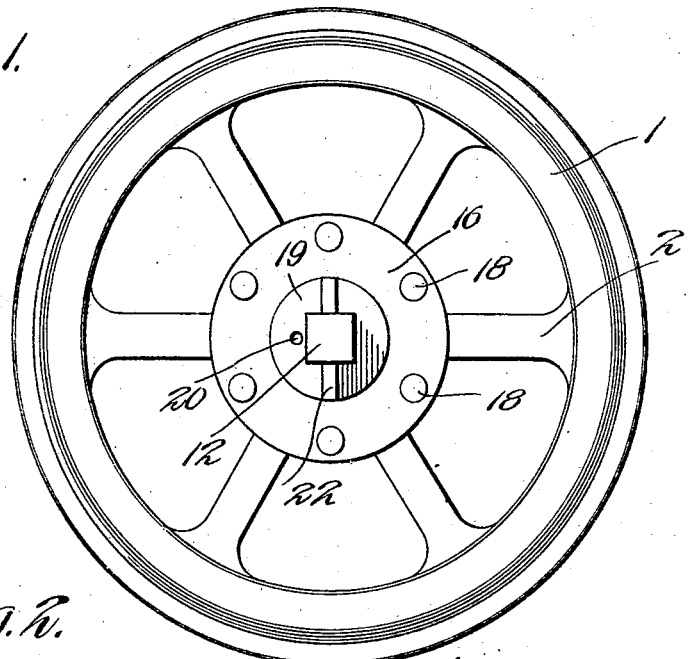
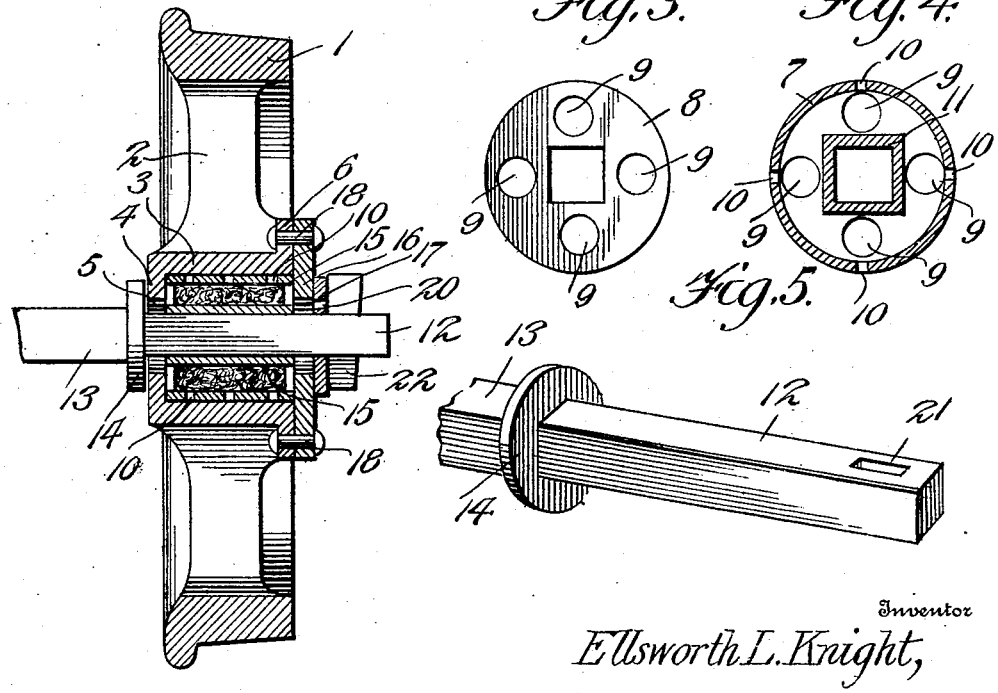
Inventor  
Ellsworth L. Knight,  
By Victor J. Evans  
Attorney
Witnesses

UNITED STATES PATENT OFFICE.

ELLSWORTH L. KNIGHT, OF COALDALE, WEST VIRGINIA, ASSIGNOR OF ONE-HALF TO EDWARD COOPER, OF BRAMWELL, WEST VIRGINIA.

CAR-WHEEL LUBRICATOR.

No. 864,004.

Specification of Letters Patent.

Patented Aug. 20, 1907.

Application filed May 6, 1907. Serial No. 371,996.

*To all whom it may concern:*

Be it known that I, ELLSWORTH L. KNIGHT, a citizen of the United States of America, residing at Coaldale, in the county of Mercer and State of West Virginia, have invented new and useful Improvements in Car-Wheel Lubricators, of which the following is a specification.

This invention relates to car wheel lubricators designed more particularly for use on mining cars but capable of use for other purposes, and one of the principal objects of the same is to provide a hollow bushing for containing lubricating material, and to provide a squared bearing in said bushing for the squared end of an angular axle, said bushing having feed holes therein for feeding the lubricant to the inner wall of the wheel which is mounted to rotate upon said bushing.

Another object of the invention is to provide simple and efficient means for lubricating wheels provided with squared axles.

These and other objects may be attained by means of the construction illustrated in the accompanying drawings, in which:

Figure 1 is a side elevation of a car wheel provided with means for lubricating the same, made in accordance with my invention. Fig. 2 is a central vertical section of the same. Fig. 3 is an end view of the hollow bushing for containing the lubricant. Fig. 4 is a central vertical section of the same. Fig. 5 is a detail perspective view of one end of the square axle.

Referring to the drawing for a more particular description of my invention, the numeral 1 designates a car wheel which may be of the usual or any suitable type, said wheel having spokes 2 and a hollow hub 3, said hollow hub having an inwardly extending flange 4 provided with a central opening 5 for the square axle, and at the opposite side of the wheel an annular outwardly extending flange 6. Fitted in the hollow hub of the wheel is a hollow bushing 7 provided with end heads 8 formed integral with the bushing, said heads having openings 9, and the body portion 7 of the bushing being provided with feed openings 10 which communicate with the interior of the bushing in line with the openings 9. An integral squared bearing extends through the bushing, and the squared end 12 of the square axle 13 extends through the bearing 11, and is provided with a suitable stop 14 for the hub of the wheel. A suitable packing 15 of waste, wool, or any suitable lubricant absorbent practically fills the body portion of the bushing between the squared bearing 11 and the inner wall of said bushing. Fitted against the annular flange 6 is a face plate 16 provided with a large opening 17 through which the axle extends, said plate being riveted, as at 18, to the flange 6. A washer 19 provided with an oil hole 20 is fitted against the face plate 16, with the oil hole 20 in position to establish communication through the opening 17 with the interior of the bushing 7. A key hole 21 is formed in the squared end 12 of the axle, and a suitable key 22 is inserted in the opening 21 and driven down to hold the wheel in place.

From the foregoing it will be obvious that the bushing 7 is fitted to the squared end of the axle, and that the wheel rotates upon the bushing, while the interior wall of the hub of the wheel is kept properly lubricated by oil passing through the feed openings 10 in the bushing, and being applied to the inner wall of the hub.

My invention is of a simple construction, will always keep the wheels properly lubricated and by means of my construction I can use a square axle which does not require finishing at the ends. Moreover, the squared axle may be securely fixed to the car truck, since the wheels rotate upon the bushing. There is a considerable saving in using an axle which does not require finishing, and which can be rolled out into the required shape, and I am enabled by using my bushing, to utilize square axles.

Having thus described the invention, what I claim is:

1. A lubricator for car wheels comprising a car wheel having a hollow hub, a bushing fitted into the hub and provided with feed openings in the periphery thereof which communicate with the interior of the bushing, a squared axle to which the bushing is rigidly secured, a face plate secured to the wheel, a washer having an oil hole therein which communicates with the bushing through said face plate, and means for holding the wheel upon the axle.

2. In a lubricator for car wheels, the combination of a cylindrical bushing having a squared axle bearing extending through the same and fitted with a squared axle, said bushing having holes in the ends thereof and feed openings extending through the cylindrical wall of the bushing and communicating with the interior of said bushing, absorbent packing in the bushing, a face plate permanently secured to the wheel and provided with an opening through which oil may be fed to the bushing, and a washer having an oil hole therein communicating with the bushing through said opening in the face plate.

In testimony whereof, I affix my signature in presence of two witnesses.

ELLSWORTH L. KNIGHT.

Witnesses:
E. P. BUNYEA,
IRVING J. KING.